United States Patent
Weiner et al.

(10) Patent No.: US 7,770,797 B2
(45) Date of Patent: Aug. 10, 2010

(54) METHOD FOR PROCESSING DATA FROM BARCODES

(75) Inventors: Herbert S. Weiner, Portland, OR (US); Eric G. Petersen, Aloha, OR (US); Jon K. Fo, Beaverton, OR (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 715 days.

(21) Appl. No.: 11/683,333

(22) Filed: Mar. 7, 2007

(65) Prior Publication Data

US 2008/0217392 A1    Sep. 11, 2008

(51) Int. Cl.
G06K 7/00    (2006.01)
(52) U.S. Cl. .................. 235/462.25; 235/462.01
(58) Field of Classification Search .......... 235/462.01, 235/462.25
See application file for complete search history.

(56) References Cited

U.S. PATENT DOCUMENTS

| | | | |
|---|---|---|---|
| 5,536,928 A | 7/1996 | Seigel | |
| 5,875,415 A | 2/1999 | Lieb | |
| 6,115,678 A | 9/2000 | Lieb | |
| 6,488,209 B1 | 12/2002 | Hunt | |
| 6,517,002 B1 | 2/2003 | Piatek | |
| 6,540,144 B1 | 4/2003 | Hudrick | |
| 6,557,765 B1 | 5/2003 | Kito | |
| 6,568,596 B1 * | 5/2003 | Shaw | 235/462.01 |
| 6,619,549 B2 | 9/2003 | Zhu | |
| 6,705,527 B1 | 3/2004 | Kelly | |
| 6,758,403 B1 | 7/2004 | Keys | |
| 6,772,947 B2 * | 8/2004 | Shaw | 235/462.01 |
| 6,877,663 B2 | 4/2005 | Kelly | |
| 7,044,383 B2 | 5/2006 | Zhu | |
| 7,097,099 B2 | 8/2006 | Hepworth et al. | |

OTHER PUBLICATIONS

International Preliminary Report on Patentability and Written Opinion of the International Searching Authority; Mailed Sep. 17, 2009 and Jul. 16, 2008; 6 pages.

* cited by examiner

*Primary Examiner*—Daniel A Hess
(74) *Attorney, Agent, or Firm*—Sonny Z. Zhan (57) ABSTRACT

Disclosed in this specification is a method for processing barcode data from one or more barcode scanners. The decoded data is reformatted in accordance with selected reformatting instructions and thereafter supplied to a software application for subsequent use. Preferably, the reformatting instructions can be customized by the end users, thus permitting the end users to adjust their system to receive previously unknown barcode formats.

27 Claims, 10 Drawing Sheets

Smith,John<CR>123456789<CR>9876-A<CR>4226<CR>

FIG. 2C

Smith,John□123456789□9876-A

FIG. 2D

Smith,John□□□1234567899876-A

FIG. 2E

<Name>Smith,John<SSN>123456789<Room>9876-A

FIG. 3A

Smith,John□123456789□9876-A
              SSN

FIG. 3B

<Name>Smith,John<SSN>123456789
 Label  Element  Label  Element

METHOD FOR PROCESSING DATA FROM BARCODES

FIELD OF THE INVENTION

This invention relates, in one embodiment, to a method for processing relevant data from barcodes, regardless of the initial format of such data. Such processed data is preferably provided to a computer, such as the central monitoring station of a medical facility.

BACKGROUND OF THE INVENTION

Barcodes are widely used in a variety of commercial endeavors. For example, barcodes are commonly used in mailing and shipping businesses to help track packages in transit. Barcodes are also used by retailers such as bookstores, grocery stores, and the like. Generally, barcode usage can be divided into two broad categories wherein: (1) the barcode system is generated to match an industry standard barcode or (2) the organization generates a unique barcode system and barcode for specialized use by the organization.

Barcode systems are often designed to comply with an industry standard. For example, book retailers design inventory and point of sale systems to handle the industry standard barcodes that publishers imprint on their books. These systems often include proprietary features that are not shared with competitors, for example, to target sales promotions to customers' past purchases; but every retailer's system must be compatible with the industry standard barcodes. Unfortunately, not all industries have established such a standard. In some industries, each organization can simply create unique barcodes.

A given organization may generate a specialized barcode which is generally only usable by the organization itself. For example, commercial shipping organizations have been known to develop barcode systems for use by their own organization. Since the barcode is only used for internal purposes, the organization may gain a competitive advantage by including proprietary information, such as a route number, on their barcodes and keeping their barcode system proprietary. For example, within the shipping industry, each individual shipping organization may have its own unique barcode and barcode system which cannot easily be adapted to the barcode system of the competing organizations.

Context also plays a role in barcode systems. For example, book retailers may scan the barcodes on books when adding them to inventory, and may scan the books again when they are sold. At the time of sale, the retailer may scan barcodes on coupons to determine discounts, and may scan barcodes on preferred customer cards to award bonuses. Clearly, the system must be able to distinguish a book from a coupon from a preferred customer card. When books are added to inventory, the barcode scanning system may look up the wholesale cost of the book, while at the time of sale, the barcode scanning system may look up the retail price. Sophisticated barcode systems use the same barcode in different ways depending upon context, and must be able to distinguish between different types of barcodes, also depending upon context.

The context may be determined by which system on a network initiates the barcode scan, or by which application program is currently active when the scan is initiated, or by which window in a particular application program is active, or by the location of the cursor within a particular window, or by any combination of these. For example, within a particular window, there may be a field for the entry of products being purchased, and a different field for the entry of coupons or discount codes.

Unfortunately, difficulties arise when providing products or systems to several organizations which have no established standard. In such situations one call never be certain what format of barcode has already been deployed by the end customer. When the organization in question utilizes products and services that are provided by multiple venders the situation becomes even more complex. The barcodes required by some systems may be incompatible with the barcodes supported by other systems, necessitating the manual entry of data in situations where the required data is already available on barcodes. The medical care industry is one such industry that suffers from the aforementioned problems.

In the medical industry centralized patient monitoring stations have begun to appear in hospitals. Such centralized stations receive data from multiple locations and permit a small number of medical personnel to monitor a large number of patients. Naturally, such stations are heavily computerized. It would be desirable to allow hospitals to enter data into their computer systems without keyboard input. Such an entry system would help to reduce data entry errors. One method for entering data into a computer system without using keyboard input utilizes barcodes.

While using barcodes to perform keyless entry of data may appear ideal, the medical industry currently suffers from a number of complications that have prevented the implementation of such a system. The primary deficiency is the lack of an accepted barcode standard. For example the hospital may build or acquire a hospital information system, including barcode printing and barcode scanning capabilities, which handles patient admission, discharge, transfer, billing, as well as equipment inventory, personnel assignment, etc. This system likely uses barcodes for patient wristbands, employee badges, equipment inventory tags, laboratory samples, pharmacy labels, etc. The hospital also acquires other equipment, such as patient monitors, infusion pumps, central patient monitoring systems, etc, that typically has not been designed to work with the barcodes used by the hospital information system. Clearly, the hospital is not able to adapt their barcodes to accommodate the requirements of all the other equipment that they acquire. The result is that data such as patient names and ID numbers must, in some cases, be manually entered into the hospital information system (such as central patient monitoring systems), since this equipment is typically not capable of scanning every possible variation of barcode that may be found in various hospitals. Unfortunately, when a wristband is scanned, the central station has no way to determine how to interpret the data. For example, one hospital may use patient wristbands which contain a patient name (last name first) followed by a medical record number, a second hospital may use patient wristbands which contain the medical record number, followed by the patient's date of birth, gender, and patient name (first name first), and a third hospital may encode only the medical record number (without the name) on the barcode. Merely telling the station "Smith, John 19420517" is insufficient. A computer views such a string as a mere series of characters. The computer is unable to "see" a name followed by a series of numbers. Additionally, the station cannot determine if the number is a patient identification number, a date of birth, or some other number, nor can the computer differentiate a first name from a last name. Moreover, some hospitals use barcodes that present data in a format that is different from the barcode format of other hospitals. For example, a patient's name may be presented as "Smith, John," "John Smith," "John B. Smith," "J. B. Smith," or any of the other possible modes of presentation. A similar quandary occurs when considering date formats. Possible date formats include, for example, May 17, 1942; 05-17-1942; 5-17-42; 05-17-42; 17-5-42; 17-May-42, along with many others. When one considers the use of two dimensional barcodes which encode for multiple data elements, the problem of reading multiple barcode formats appears staggering.

Therefore, a method for processing barcode data is desired wherein the data can be provided to a software application in an acceptable format, regardless of the initial format of the data.

SUMMARY OF THE INVENTION

The invention comprises, in one form thereof a system that makes it possible for a central monitoring system of a hospital to easily adapt to the wide range of barcodes deployed in hospitals, so that the barcodes already in use in the hospital can be scanned without modification, and without providing custom software for each hospital.

BRIEF DESCRIPTION OF THE DRAWINGS

The present invention is disclosed with reference to the accompanying drawings, wherein:

FIG. 2, which includes FIGS. 2A-2E, are examples of decoded data;

FIG. 3, which includes FIGS. 3A and 3B, are additional examples of decoded data;

Corresponding reference characters indicate corresponding parts throughout the several views. The examples set out herein illustrate several embodiments of the invention but should not be construed as limiting the scope of the invention in any manner.

DETAILED DESCRIPTION

Figure 1:
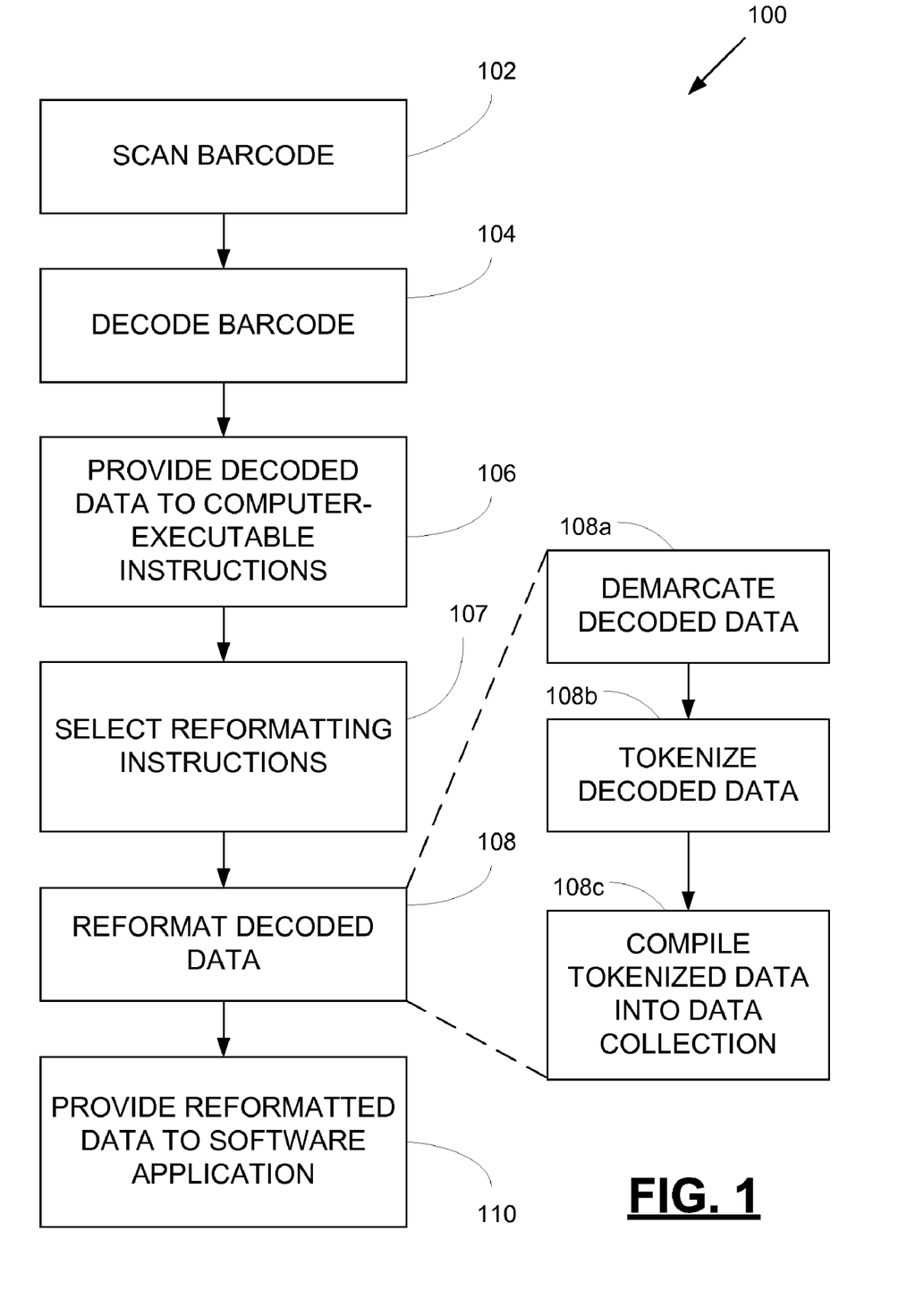
FIG. 1 is a flow diagram of one process of the invention.

FIG. 1 is a flow diagram of one method 100 of processing barcode data. Method 100 is initiated by executing step 102, wherein a barcode is scanned with a barcode scanner. Any suitable barcode and barcode scanner may be used. For example, scanners suitable for reading both linear and two dimensional barcodes are contemplated for use with the instant invention. Such barcodes may encode for a single data element or they may include a plurality of data elements. When a barcode is scanned, the barcode provides coded data to the barcode scanner. This coded data is decoded in step 104.

In step 104 of method 100, the coded data obtained by scanning the barcode is decoded. Typically, the scanner itself is configured to perform step 104, as the precise code being used (i.e. the symbology of the barcode) will vary from barcode to barcode. In other words, the scanner is selected to match the barcode such that the barcode can be decoded. A variety of suitable scanners are known in the art. Autodiscriminating scanners, which are scanners that can detect and decode multiple symbologies, may also be used in conjunction with the instant invention. Examples of commonly used symbologies include, but are not limited to, Code 16K, Code 39, Code 49, Codabar, Code 128, UPC-E, UPC-A, EAN-8, EAN-13, Reduced Space Symbology, PDE-417, Interleaved 2-of-5, Aztec, and the like. Once the scanner has decoded the coded data, such decoded data is provided to a computer for processing. Such a step is executed in step 106.

In step 106 of method 100, the decoded data is provided to a computer for processing. Such decoded data is generated by the scanner and presented in a computer-readable format, such as in the American Standard Code for Information Interchange (ASCII) format or ISO Latin 1. The data so provided is preferably stored by the computer in a computer-readable medium, such as in a hard disc, in random-access memory (RAM), an optical storage medium such as a compact disc (CD), or in a similar medium.

In step 107 of method 100, the computer-executable instructions that are to be used in step 108 are selected from a plurality of computer-executable instructions. Such a selection step may be made based upon a number of criteria. For example, the station where the barcode is located may generate an identifier that causes a specified set of instructions to be selected. Alternatively, the user may specify a set of instructions which is to be applied by interacting with a software application. In another aspect of the invention, the barcode itself includes a data label which serves to identify which set of instructions should be selected. In yet another embodiment, the workflow of the organization determines which set of instructions should be applied. For example, upon the first scan, instructions A are applied and during the second scan instructions B are applied. In this manner a hospital may, for example, sequentially scan a patient's wristband followed by the patient's badge, and both barcodes will be properly processed.

In step 108 of method 100, the decoded data is reformatted so as to place the data in a standardized data format. The method for reformatting the decoded data is preferably stored as a plurality of computer-executable instructions (e.g. software) stored on a host computer. Such a host computer is preferably a network server that is operatively connected to multiple barcode scanners. In one embodiment, the network s is the central monitoring station of a medical facility such as a hospital. The decoded data is processed in accordance with the computer-executable instructions and reformatted data is generated. The details of such a reformatting step are discussed in greater detail elsewhere in this specification. Once the data has been reformatted, such data is provided to a software application (step 110) for later use.

Figures 2, 2A:
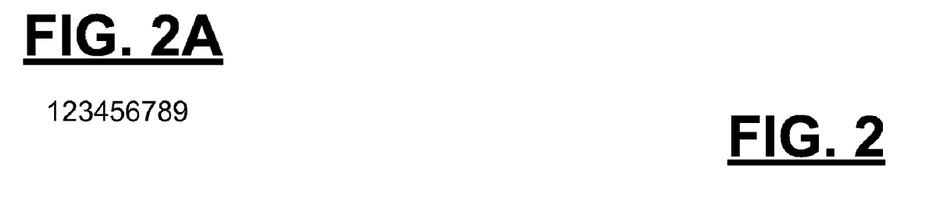

Referring again to FIG. 1, the details of reformatting step 108 are depicted in sub-steps 108a, 108b and 108c. In sub-step 108a, the decoded data provided in step 106 is demarcated in accordance with the computer-executable instructions located on the host computer. FIG. 2, which includes FIGS. 2A to 2E, provides examples of such a demarcation step.

Referring now to FIG. 2, the decoded data is demarcated in accordance with the computer-executable instructions. In this specification, the term "demarcate" refers to the act of determining the boundaries surrounding a given "data element." A "data element" is a series of characters with a logical association such as, for example, a Social Security number, a name, a room number, a date of birth, and the like. A data element may be comprised of other data elements. For example, the data element "Name" may be comprised of the data elements "First Name" and "Last Name."

Referring to FIG. 2A, a string of numbers is shown. The computer-executable instructions provide the guidance necessary to properly demarcate such a string. For example, in one embodiment, such instructions may demarcate the string every nine characters. In such an embodiment, only a single data element is shown in FIG. 2A. In another embodiment, such instructions may demarcate the string between the fourth and fifth character. In such an embodiment, two data elements would be shown in FIG. 2A. Some barcodes provide a delimiter which can be used to help demarcate the decoded data. An example of such a delimiter is shown in FIG. 2B.

Figure 2B:
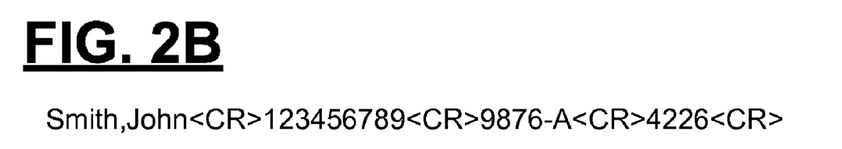

Referring now to FIG. 2B, the decoded data is comprised of a string of characters with carriage returns (<CR>) interspliced at certain positions in the string. In one embodiment, the computer-executable instructions interpret such a carriage return as a delimiter that separates two data elements. In this manner the host computer can determine the location of each of the data elements and properly demarcate each such element. In the embodiment presented in FIG. 2B, four such data elements are shown.

Figure 2C:
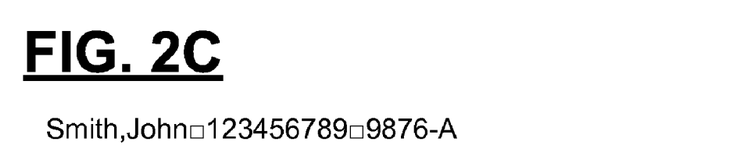

Referring to FIG. 2C, an example of an alternate delimiter is given. The embodiment depicted in FIG. 2C, the delimiter is one or more blank spaces. For the sake of clarity, such blank spaces are depicted as empty squares. Other delimiters may also be used. Examples of suitable delimiters include commas, blank spaces, tab delimiters, carriage returns, semicolons, a designated string of characters, and the like. In some embodiments, the delimiter is a character (or series of characters) that cannot be found in the character string to be demarcated. So, for example, of spaces may be present in the name field, (e.g. Van Dyke) then spaces would preferably not be used as a delimiter.

Figure 2D:
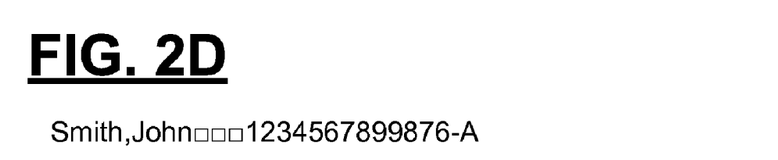

In the example illustrated in FIG. 2D, no delimiter is present, but the computer-executable instructions dictate that the first data element is given by the first thirteen characters, the second element is given by the next nine characters, and the third element is given by the next six characters. In this manner, the decoded data can be demarcated without using delimiters.

Figure 2E:
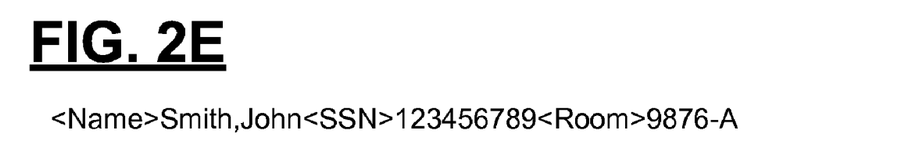

Referring now to FIG. 2E, the decoded data contains data labels that can be used by the computer-executable instructions to help demarcate the data elements. As used in this specification, a "data label" is a an indicator that helps a computer assign a logical meaning to a data element. In the embodiment depicted in FIG. 2E, the beginning of a data label is denoted by a "<" and the terminus of a data label is indicated by a ">" character. In this manner, the data labels and data elements can be independently demarcated. Data labels may also serve as a type of delimiter, as they can be used to determine the end of one data element and the beginning of the next.

In one aspect of the invention, the computer-executable instructions are configurable by an end-user after the software has been installed on the central monitoring station. During a typical installation process, a software manufacturer will install the software on a central monitoring station with a specified set of computer-executable instructions. Since, in the instant embodiment, the computer-executable instructions are configurable by the end-user, it follows that the hospital can modify the formatting instructions without needing to contact the software manufacturer. For example, the formatting instructions may be configurable such that the demarcation criteria is altered. Examples of demarcation criteria are found throughout this specification. For certain applications, such a configuration increases the usefulness of the invention.

In one embodiment, the computer-executable instructions are configurable through an end-user-interface. Such an end-user-interface permits the end-user, who may not necessarily be a computer programmer, to configure the computer-executable instructions. Similar user-interfaces are well known in the art, and often find application in macro writing.

Figures 3, 3A:
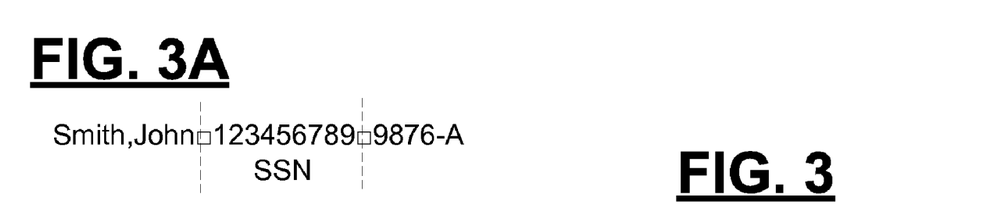

Referring again to FIG. 1, once the decoded data has been properly demarcated (sub-step 108a) then sub-step 108b is executed, wherein the demarcated data is tokenized. Reference may be had to FIG. 3.

Figure 3B:
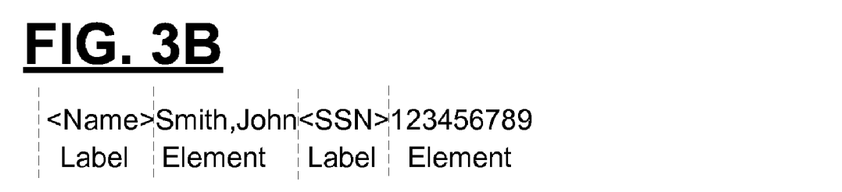

FIG. 3, which includes FIGS. 3A and 3B, is an example of the tokenizing of data elements. Referring to FIG. 3A, the data has been demarcated into three data elements using spaces as the delimiter prior to being tokenized. The term "tokenize" refers to the assignment of a logical meaning to a given data element and giving a computer variable the value of the data element. For example, the data element "123456789" may be tokenized to be given the meaning of a Social Security number, the computer variable "SSN" is assigned the value of "123456789." Alternatively, such an element could be tokenized to be given the meaning of a patient identification number. In accordance with the computer-executable instructions, the first such element is tokenized to be the patient's name. Such a data element maybe further demarcated and tokenized such that the element is comprised of two sub-elements, delimited by a comma. The first such sub-element is the last name, and the second such sub-element is the first name. The second data element is tokenized to be the patient's Social Security number. The third such data element is tokenized to be the room number. In the embodiment depicted in FIG. 3A, such tokenizing is determined based upon the order of the demarcated data. In FIG. 3B, a data label assists such tokenizing.

In FIG. 3B, two data elements and two data labels are shown. In the embodiment depicted in FIG. 3B the data element is tokenized in accordance with the computer-executable instructions such that its assigned value is dictated by the data label which precedes such element. For example, the data label "<NAME>" precedes the data element "Smith, John" and therefore such element is tokenized to be the patient's name. Likewise, the data label "<SSN>" is tokenized to be the patient's Social Security number. The patient's name may, in turn, be tokenized into sub-elements as previously described.

Referring again to FIG. 1, once the demarcated data has been properly tokenized (sub-step 108b), the tokenized data elements are compiled into reformatted data collection. Such a compilation occurs in sub-step 108c. A more detailed depiction of sub-step 108c is given in FIG. 4.

Figure 4:
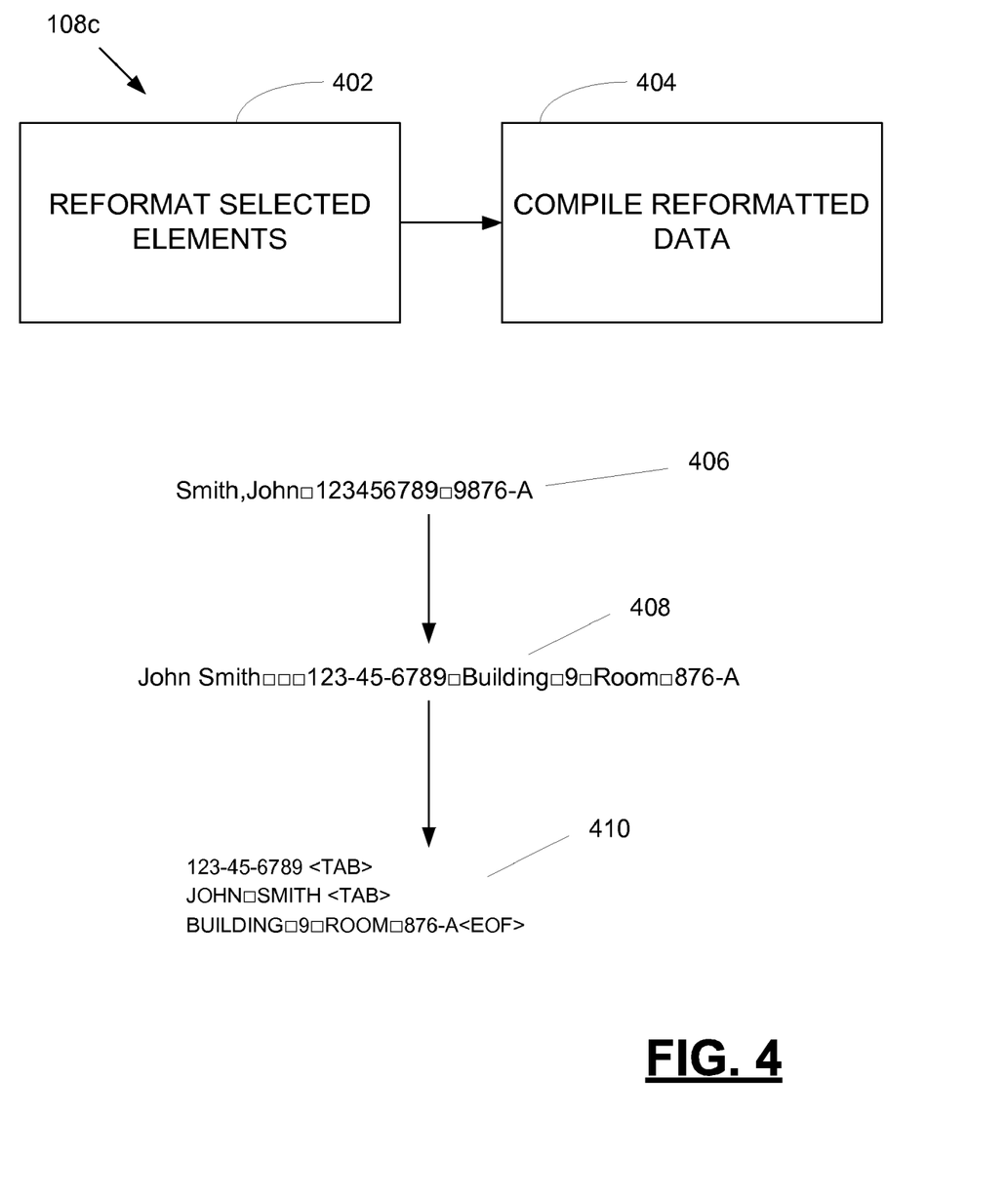
FIG. 4 is a depiction of one process for use with the instant invention and an example of decoded data being subjected to one example of such a process.

As shown in FIG. 4, sub-step 108c is comprised of sub-steps 402 and 404. In sub-step 402, selected elements from the list of tokenized data elements are reformatted. For example, in the embodiment depicted in FIG. 4, data collection 406 contains three data elements, the first of which has been tokenized to indicate it is the patient's name. In data collection 406, the patient's name is in the format "last name, first name." As previously discussed, such a data element has also been tokenized into sub-elements to indicate the first and last name of the patient. During reformatting sub-step 402, the two sub-elements have their relative order altered, and thus produce data collection 408. In data collection 408, the patient's name has been reformatted to be in the format "first name last name." Additionally, the trailing spaces have been truncated. Additionally, the patient's Social Security number (shown in data collection 406) is initially a simple a string of numbers. In data collection 408, the Social Security number has been annotated to include hyphens at character positions four and seven. In a similar manner, the patient's room number has been annotated to include additional characters such as the words "building" and "room." In addition to truncation and annotation, the data elements may be edited in other ways. For example, two data elements may be concatenated into a single element. Alternatively or additionally, a data element may have selected characters deleted. In another embodiment, not shown, the entire data element may be deleted. Once sub-step 402 has been completed, data collection 410 is produced by executing sub-step 404.

Referring again to FIG. 4, once the individual data elements have been reformatted in sub-step 402, sub-step 404 is executed wherein the reformatted data elements are compiled into reformatted data collection 410. In the embodiment depicted in FIG. 4, several changes occurred during sub-step 402. For example, the order of the data elements was altered during compilation such that the Social Security number is now the first data element, and the patient's reformatted name is now the second element. Additionally, a delimiter has been added after each data element. In the embodiment depicted, the delimiter is a "TAB" indicator. In other embodiments, not shown, multiple delimiters are inserted after certain data elements. Lastly, in sub-step 404, an End-of-File (EOF) marker has been added to indicate the end of the present data collection 410.

The following examples are provided to help clarify certain aspects of the present invention. Such examples are merely explanations of certain embodiments. Such explanations should not be interpreted to Limit to scope of the invention to such embodiments.

EXAMPLE 1

Example 1, shown in FIG. 6, will now be described with reference to FIG. 5, wherein a plurality of barcodes are provided each of which encode for a single data element. In the instant embodiment, computer-executable instructions dictate that the decoded data should be annotated with a <TAB> marker at the end of each data collection. In the present example, each of the four barcodes shown in FIG. 6 contain a single data element.

Figure 5:
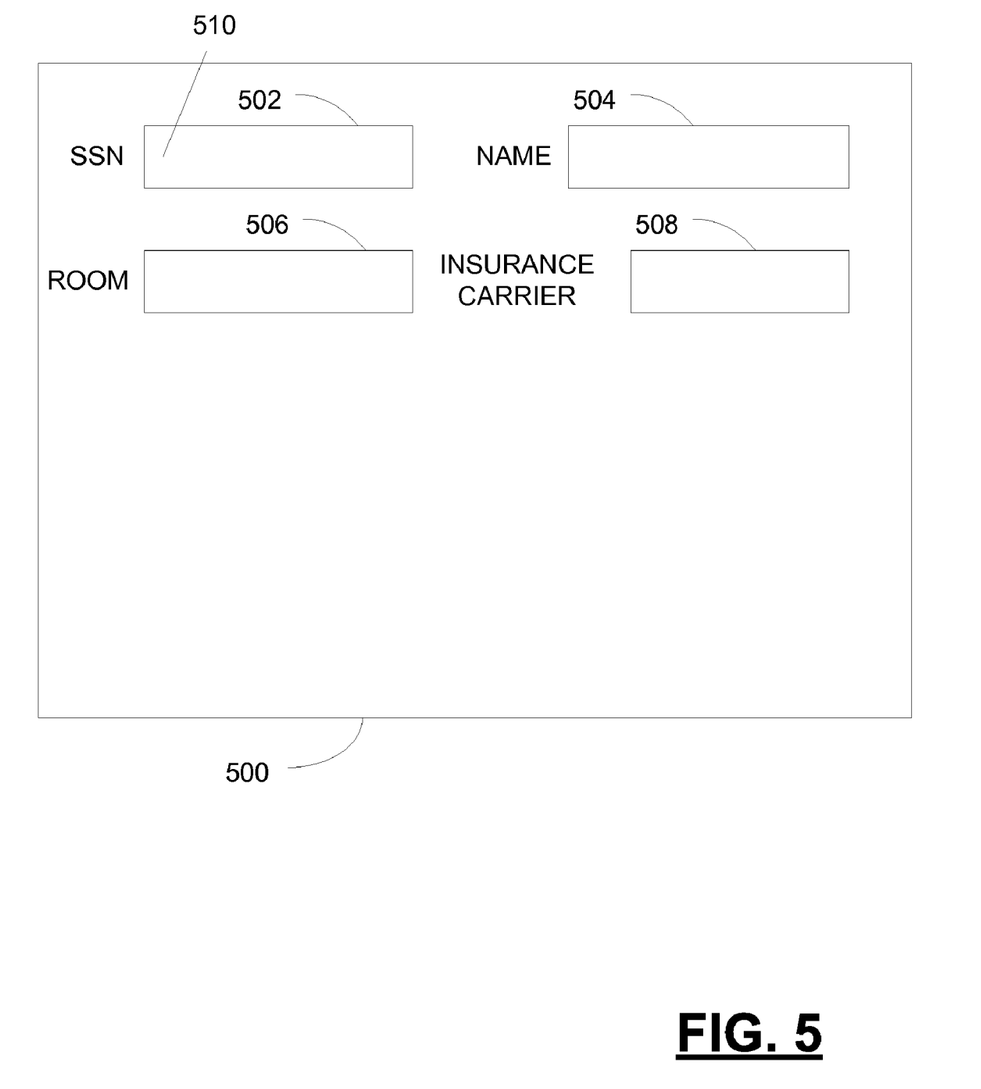
FIG. 5 is a depiction of a screen with a plurality of data fields to be populated in accordance with the invention.

Referring now to FIG. 5, screen 500 is the screen of a computer monitor on a central monitoring station at a hospital. Screen 500 has a plurality of fields for displaying data. Such fields include Social Security field 502, name field 504, room field 506, and insurance field 508. The software application which populates the aforementioned fields is configured such that the user can press the tab key to move between the fields in the aforementioned order. The user places the cursor at first cursor position 510 such that Social Security field 502 is selected. Thereafter, the user scans barcode 600 (see FIG. 6) which is the encoded Social Security number for the patient at issue.

Figure 6:
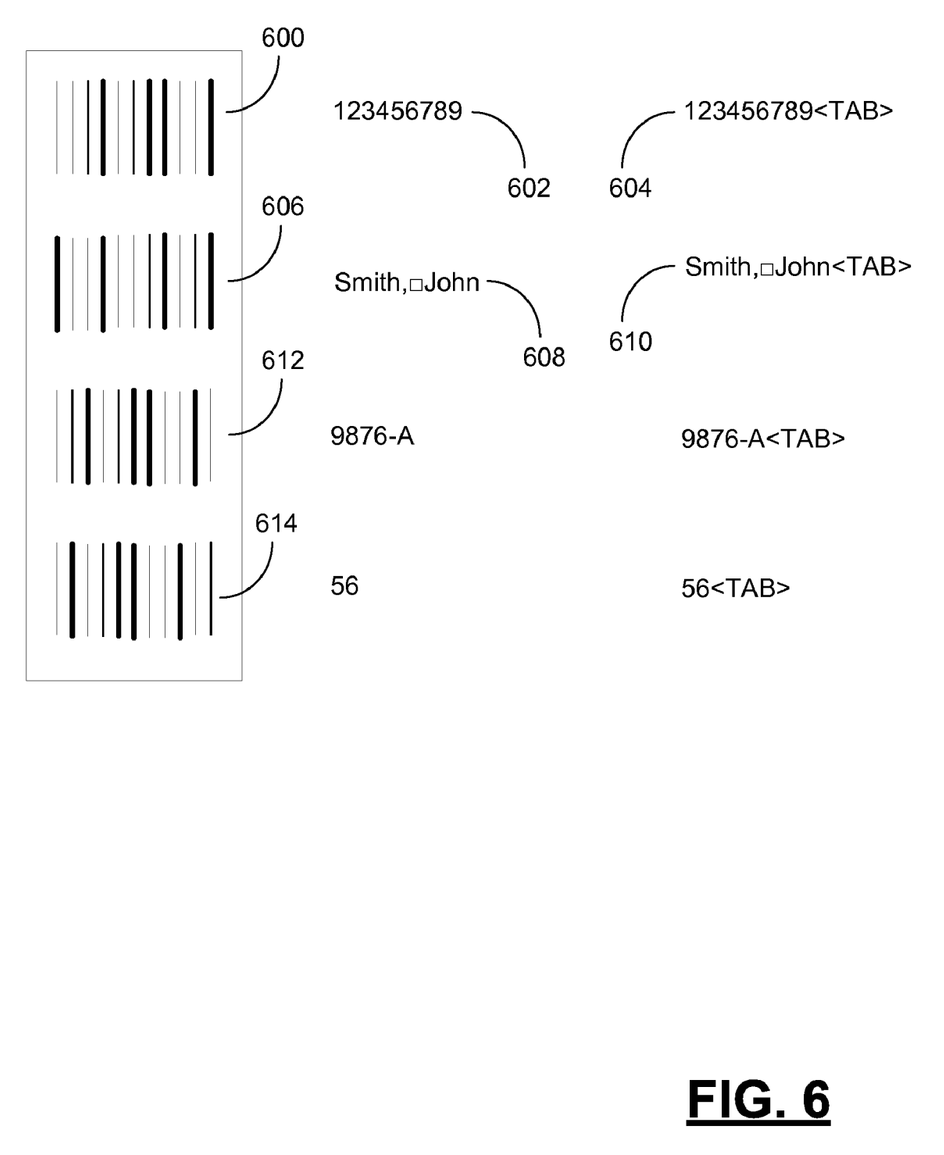
FIG. 6 is an example of one mode of barcode presentation for use with the present invention.

Referring now to FIG. 6, barcode 600 is the encoded Social Security number for the patient at issue. The user scans barcode 600 and the barcode scanner generates decoded data 602. Such decoded data is provided to the central monitoring station. The central station recognizes that the cursor is presently located in the Social Security field and recalls the computer-executable instructions that apply the appropriate reformatting commands. In the present embodiment, the reformatted data 604 is identical to decoded data 602 except in that a <TAB> delimiter is added at the end of the data collection. The formatted data is then provided to the software application.

Referring again to FIG. 5, when the software application receives reformatted data 604, the Social Security field 502 becomes populated with the value "123456789" just as if the user had typed the data. When the software application receives the <TAB> delimiter, the software application advances the cursor to the next data field—name field 504. Name field 504 is now the currently selected field.

Name field 504 is then populated in an analogous manner by scanning barcode 606. The scanner produces decoded data 608. The central station recalls the appropriate computer-executable instruction and generates reformatted data 610. In the present embodiment, such instructions are the same for all fields—a <TAB> delimiter is added.

When the software application receives reformatted data 610, the name field 504 (see FIG. 5) becomes populated with the value "Smith, John" just as if the user had typed the data. When the software application receives the <TAB> delimiter, the software application advances the cursor to the next data field—room field 506. Room field 506 is now the currently selected field.

Similarly, room field 506 and insurance field 508 are populated by scanning barcodes 612 and 614. In the present embodiment, the insurance field 508 will contain the value "56." Such a value is a unique primary key that is used by the central station to cross-reference data corresponding to the desired insurance carrier.

EXAMPLE 2

Figure 7:
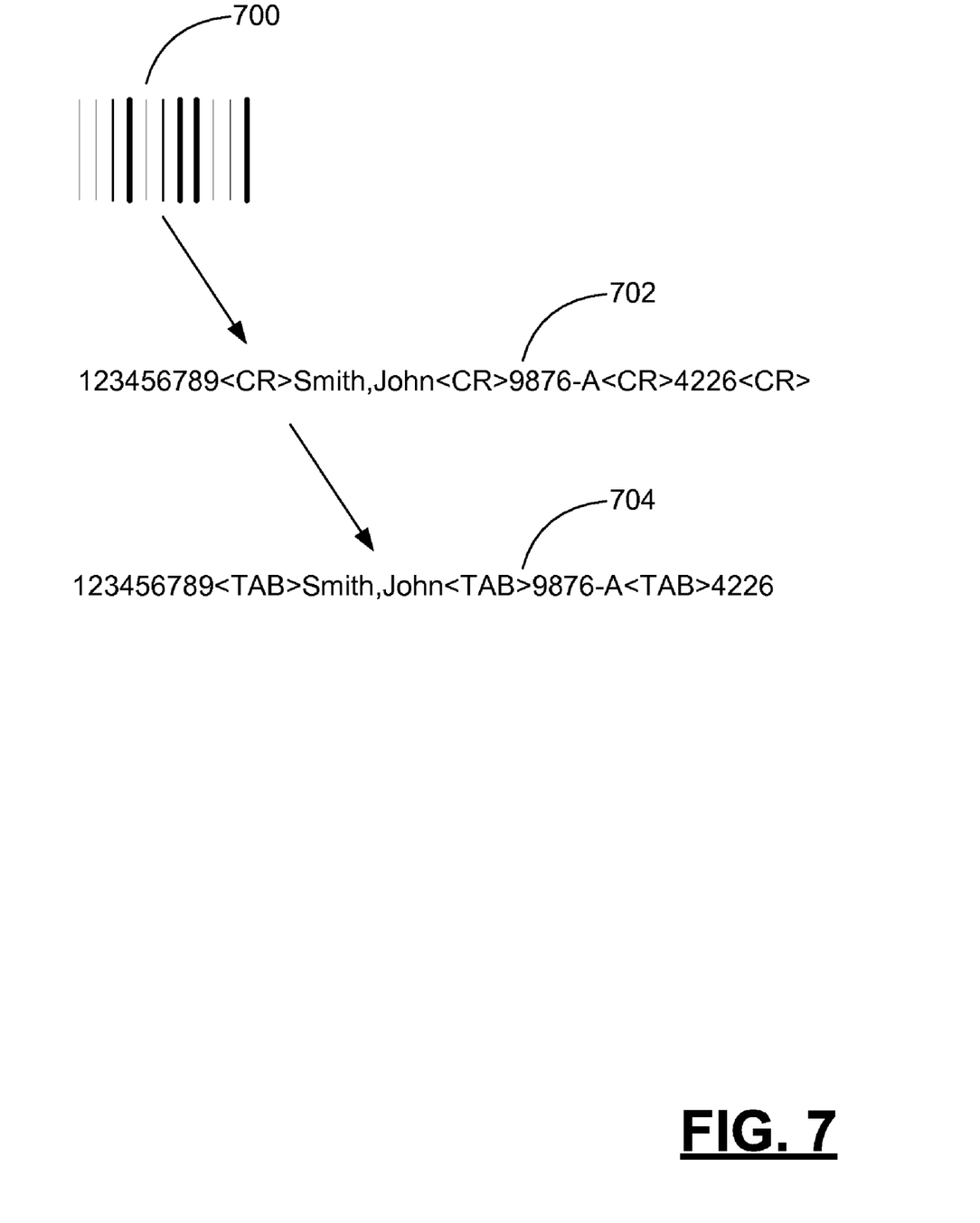
FIG. 7 is an example of another mode of barcode presentation.

Example 2, shown in FIG. 7, will now be described wherein a single barcode 700 is provided which encodes for a plurality of data elements. In the instant embodiment, the computer-executable instructions dictate that the current delimiter, a carriage return, should be replaced with a <TAB> marker at the end of each data element.

Referring again to FIG. 5, the cursor is placed at first cursor position 510 such that the Social Security number field 502 is selected. In the present embodiment, when the decoded data 702 is provided to the central station, the station recalls the appropriate computer-executable instruction that corresponds to screen 500. In accordance with the instructions, the carriage returns are replaced with <TAB> delimiters and data collection 704 is generated. The final carriage return is not replaced, hut is simply deleted. When the data collection 704 is provided to the software application fields 502, 504, 506, and 508 each become appropriately populated. Since the delimiter is a <TAB>, and since the software application interprets the <TAB> as an instruction to move to the next field, the user can populate all four fields by scanning a single barcode 700.

EXAMPLE 3

Figure 8:
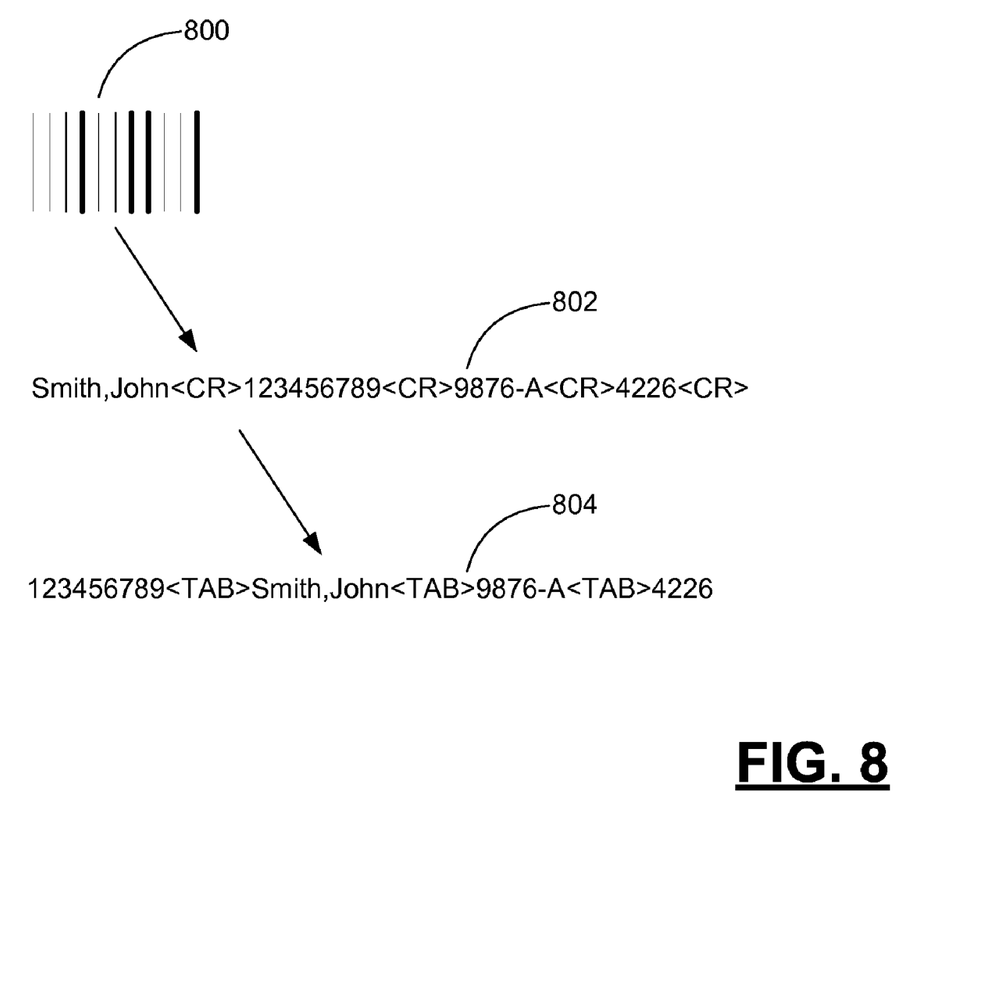
FIG. 8 is an example of yet another mode of barcode presentation and processing.

Example 3, shown in FIG. 8, is substantially similar to Example 2, except in that the barcode 800 is provided by a different manufacturer. The instant software application (see FIG. 5) anticipates receiving decoded data in a certain order. Specifically, the software application expects to receive the patient's Social Security number, followed by the patient's name. The manufacturer who generated barcode 800 provides the decoded data in an order which is not initially compatible with the present software application illustrated in FIG. 5. Reformatting is used to rectify this deficiency.

In the instant embodiment, barcode 800 is scanned and decoded data 802 is produced. The relative order of the name and social security data elements is altered during compilation of the data collection 804. Additionally, the computer-executable instructions dictate that the current delimiter, a carriage return, should be deleted and a <TAB> marker should be annotated at the end of each data element. In this manner the data collection 804 is placed in a format that is suitable to populate screen 500. The data collection 804 is then provided to the software application as previously discussed.

EXAMPLE 4

Figure 9:
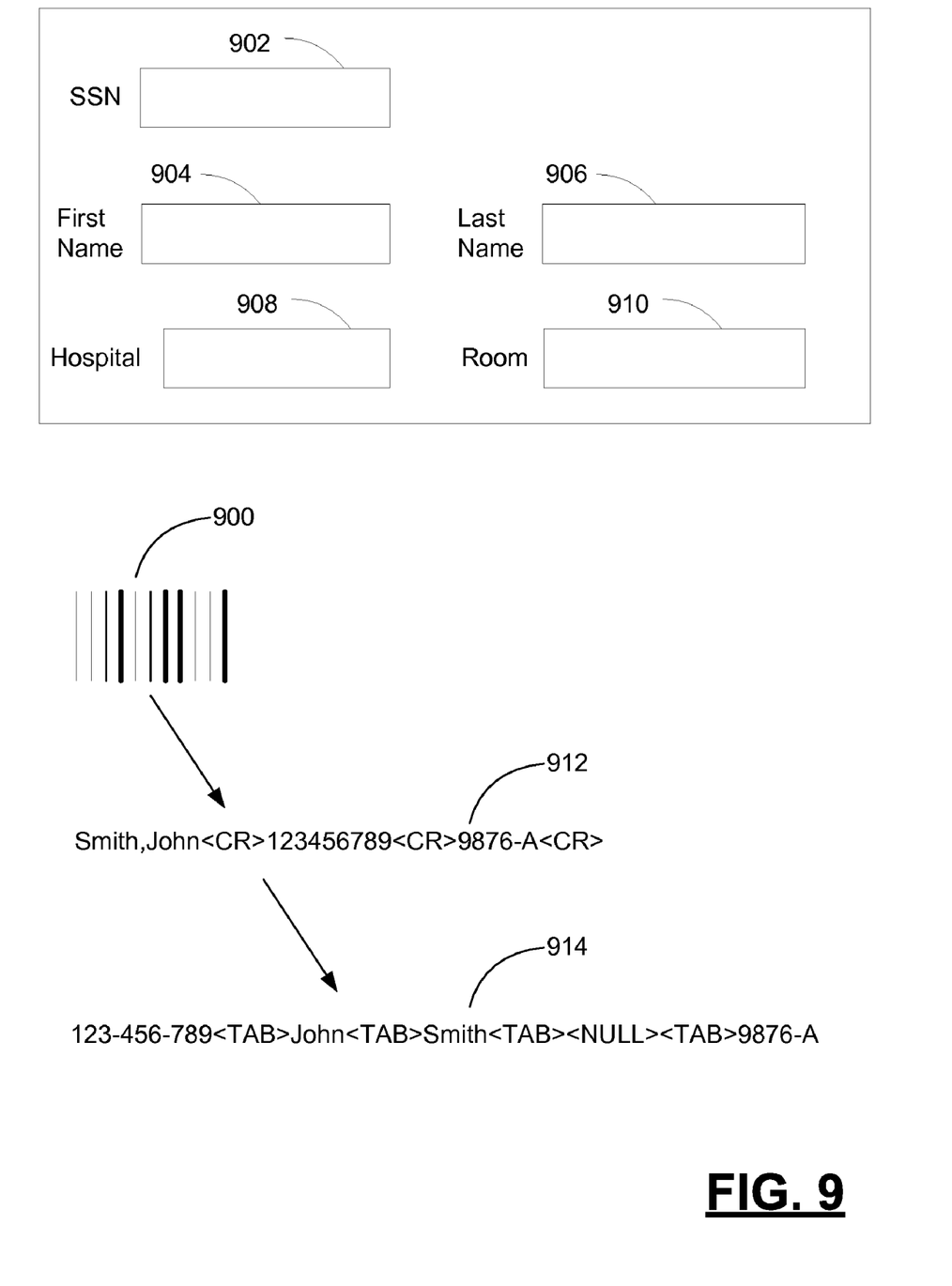
FIG. 9 and FIG. 10 are depictions of other modes of barcode presentation and processing, which includes examples of a screen to be populated.

Example 4, shown in FIG. 9, is similar to Example 3, except in that the barcode 900 is provided by yet another manufacturer. Unlike Example 3, the software application which receives the formatting data contains supplemental hospital field 908 which is not presented in the decoded data. The computer-executable instructions demarcates and tokenizes the name field into a first name element and a last name element suitable to populate fields 904 and 906. The Social Security number is annotated by including hyphens. Reformatting is again used to address these deficiencies.

Referring now to FIG. 9, in the embodiment depicted therein, barcode 900 is decoded to generate decoded data 912. The central station detects the instant software application (see FIG. 5) and the barcode scanner terminal which provided the decoded data 912 and recalls the appropriate computer-executable instructions. When such instructions are applied to decoded data 912, reformatted data collection 914 is generated. In accordance with the instructions, the fourth data element (corresponding to hospital field 908) has been assigned a null value, as the barcode 900 does not contain the data necessary to populate such a field. When reformatted data collection 914 is provided to the software application, fields 902, 904, 906, 908 and 910 are appropriately populated as previously described. Hospital field 908 contains the null value. Supplemental data, such as hospital field 908, may be entered manually.

EXAMPLE 5

Figure 10:
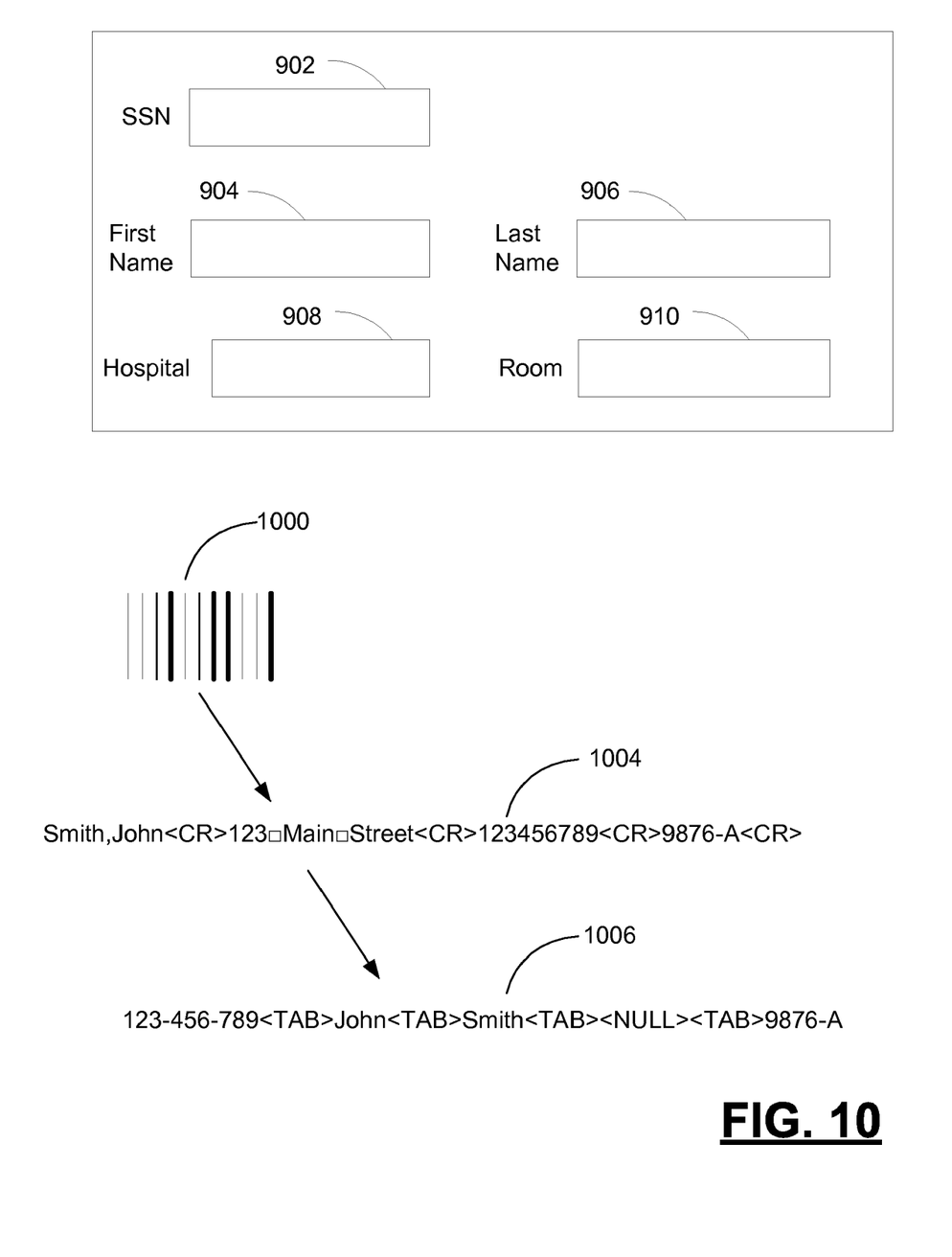

Example 5, shown in FIG. 10, is similar to Example 4, except in that the barcode 1000 is provided by yet another manufacturer. Unlike Example 4, the barcode 1000 contains additional data (a street address) which is not used by the software application. Reformatting is again used to rectify this deficiency by omitting the unused element during the reformatting step.

Referring again to FIG. 10, decoded data 1004 contains the patient's name, address, and social security number. The software application detects which barcode scanning terminal is providing the decoded data 1004 and recalls the appropriate computer-executable instructions. During the reformatting step, the decoded data 1004 is reformatted to generate data collection 1006 which is in a format suitable to populate the fields shown in FIG. 10. Since the screen does not contain an address field, during compilation of the data collection 1006, the address data is omitted. Like the previous examples, the order of the data elements was altered and the empty data elements, such as hospital field 908, was populated with null values.

EXAMPLE 6

Example 6, not shown, is similar to Example 5, except in that the empty fields are later populated by scanning additional barcodes.

In the present Example, the process is initiated in a manner identical to that described for Example 5. Once the Social Security number, first name and last name fields are populated, the user places the cursor within hospital field 908 (see FIG. 10). The user then scans a separate "hospital" barcode which populates hospital field 908 in a manner similar to that described in Example 1.

EXAMPLE 7

Example 7, not shown, is similar to Example 6 in that an additional barcode is scanned to populate the hospital field. However, in the present example, the decoded data which is provided by the scanner is comprised of a data label "<Hospital_ID>" which is used by the central station to identify the data. The central station then populates hospital field 908 (see FIG. 10) with the appropriate data, even if the cursor was not placed within hospital field 908 prior to scanning the barcode.

EXAMPLE 8

Example 8, not shown, generates a data collection which is stored as a data file. Such a data file is later queried by one or more software applications for the data elements contained therein. A new data file may be created or the data collection may be appended to or inserted into an existing file. The data collection may add data elements to the data file, or replace existing data.

In Example 8, barcode data is scanned as described in the other Examples. Example 8 differs from Examples 1-7 in that the data is not displayed, but is imported directly to a software application which organizes and saves the reformatted data collection in a data file. In one embodiment, the data elements are stored in the data file in a predetermined order, such that a second software application can query the data file and retrieve the desired data element(s). In another embodiment, the data elements are annotated with data labels in the data file to facilitate such retrieval. In yet another embodiment, both data labels and a predetermined order are used to facilitate retrieval of data. In one embodiment, and End of File (EOF) marker is annotated to the last data element in the data collection to denote the terminus of the data file. The data file may be a plurality of related files or tables, such as a relational database.

EXAMPLE 9

Figure 11:
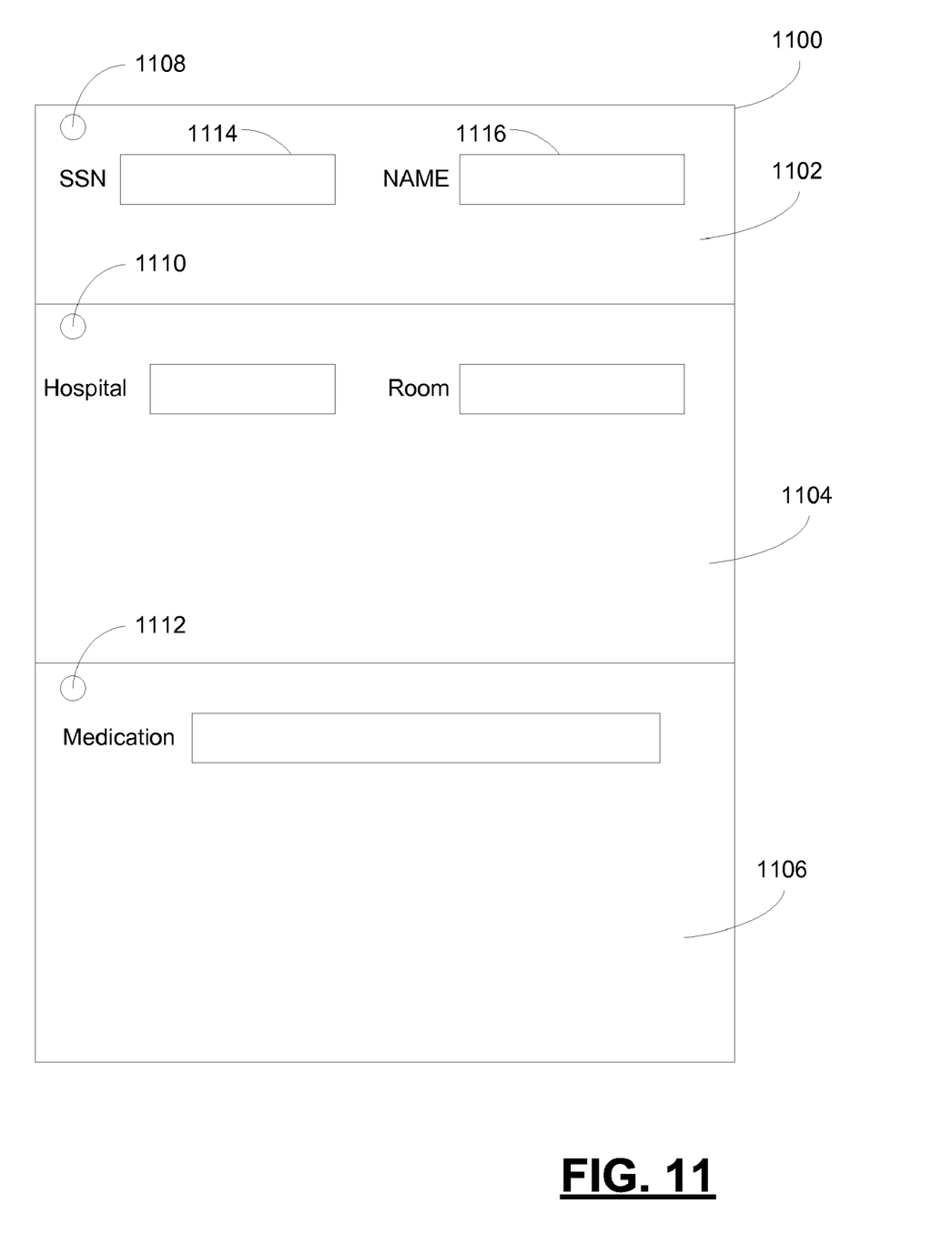
FIG. 11 is an illustration of another screen to be populated in accordance with the instant invention.

In Example 9, shown in FIG. 11, a single central networked computer station is operatively connected to a plurality of client terminals with barcode scanners. The barcode scanners are configured to read barcodes provided by different manufacturers and provide the decoded data to the central station over the network. The central station detects which formatting instruction should be applied, recalls the appropriate computer-executable instruction, and generates a reformatted data collection. In one preferred embodiment, the computer-executable instructions are loaded on the networked computer. The reformatted data collection is then provided to a software application. Such a software application may be, for example, a discrete program, a subroutine, a module of code, and the like.

Referring again to FIG. 11, a software application generates screen 1100 which is sub-divided into patient screen 1102, hospital screen 1104 and medication screen 1106. Each of such screens include one of the radio buttons 1108, 1110, and 1112. A user selects one of the radio buttons and thereby makes the selected sub-screen the currently selected screen. Based upon which screen is currently selected, the central station recalls a specified computer-executable instruction from a plurality of computer-executable instructions. In other embodiments, not shown, such a selection is made by the software application itself based upon the detection of which barcode scanning terminal is providing the data collection. For example, all data coming from the pharmacy barcode scanning terminal may be automatically treated as pertaining to medication screen 1006, and the appropriate reformatting instructions are applied. In one such embodiment, the decoded data provided by the scanner includes an indicator which is used by the terminal to properly identify the correct set of computer-executable instructions.

Referring again to FIG. 11, screen 1100 is populated by selecting radio button 1108 which makes patient screen 1102 the currently selected screen. Accordingly, the computer-executable instructions for such patient data are recalled. When the central station receives decoded data from a barcode scanner, the proper reformatting commands are applied and fields 1114 and 1116 are populated. For example, the first data element received (the Social Security Number) may have hyphens included at positions four and seven.

After patient screen 1102 is populated, hospital screen 1104 is selected by activating radio button 1110. Hospital screen 1104 becomes the currently selected screen. Accordingly, the computer-executable instructions for such screen are recalled. In the instant Example, such instructions differ from the instructions used to format screen 1102.

In the present example, medication screen 1106 contains data concerning the medications the patient is currently taking. Such data is entered into the central monitoring station by scanning the barcodes on the medicine containers. In the present example, the barcodes on the medicine containers encode for Universal Product Codes (UPC) using the Code 39 symbology. At the hospital of the instant example, the only barcodes which use Code 39 symbology are the medicine containers. The barcode scanner terminal at the hospital's pharmacy, which originally scanned the container, provides an appropriate indicator to the central station. The central monitoring station detects that the decoded data was originally encoded in Code 39 symbology. Accordingly, radio button 1112 is automatically selected by the central monitoring station, and the fields in screen 1106 are populated after applying the appropriate computer-executable instruction to format the data.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A computer system for processing barcode data comprising the steps of:
   providing a computer connected to a plurality of barcode scanners, the computer being configured to receive at least two different formats of barcodes,
   scanning a barcode with a barcode scanner, thereby obtaining coded data,
   decoding the coded data, thereby producing decoded data,
   providing the decoded data to the computer,
   selecting by the computer, from a plurality of computer-executable instructions, a set of computer-readable instructions for proper reformatting of the coded data,
   reformatting the decoded data in accordance with the selected set of computer-executable instructions which contains reformatting instructions by
      demarcating the decoded data into one or more data elements in accordance with the selected computer-executable instructions, thus producing one or more demarcated data elements, and
      compiling at least one of the data elements in accordance with the selected computer-executable instructions to produce a reformatted data collection,
   providing the reformatted data collection to a software application, and wherein the step of selecting the computer-executable instructions includes the step of determining which barcode scanning terminal provided the decoded data.

2. The computer system as recited in claim 1, wherein the step of reformatting includes the step of tokenizing at least one of the demarcated data elements in accordance with the selected computer-executable instructions, thereby producing one or more tokenized data elements.

3. The computer system as recited in claim 1, wherein the barcode is a linear barcode with a plurality of data elements.

4. The computer system as recited in claim 1, wherein the barcode is a two dimensional barcode with a plurality of data elements.

5. The computer system as recited in claim 1, wherein the barcode is a linear barcode with a single data element.

6. The computer system as recited in claim 1, wherein the barcode is a two dimensional barcode with a single data element.

7. The computer system as recited in claim 1, wherein supplemental data, which is not contained in the barcode, is manually entered into the software application.

8. The computer system as recited in claim 1, further comprising the step of configuring at least one computer-executable instruction from the plurality of computer-executable instructions such that the reformatting of the decoded data is altered by an end-user.

9. A computer-readable medium having software instructions for performing a method comprising the steps of:
   receiving decoded data from a barcode scanner, selecting, from a plurality of computer-executable instructions, a set of computer-readable instructions for proper reformatting of the coded data,
   reformatting the decoded data in accordance with the set of computer-executable instructions which contains reformatting instructions by
      demarcating the decoded data into one or more data elements in accordance with the selected computer-executable instructions, thus producing one or more demarcated data elements,
      tokenizing at least one of the demarcated data elements in accordance with the selected computer-executable instructions, thereby producing tokenized data elements, and
      compiling at least one of the tokenized data elements in accordance with the selected computer-executable instructions to produce a reformatted data collection,
   providing the reformatted data collection to a software application, and wherein the step of selecting the computer-executable instructions includes the step of determining which barcode scanning terminal provided the decoded data.

10. The computer readable medium as recited in claim 9, wherein at least one of the plurality of computer-executable instructions is configurable by an end-user after installation of the software instructions.

11. The computer readable medium as recited in claim 10, wherein at least one of the computer-executable instructions is configurable such that the end-user controls the reformatting of the decoded data.

12. The computer readable medium as recited in claim 11, wherein at least one of the computer-executable instructions is configurable such that the end-user controls the reformatting of the decoded data by specifying demarcation criteria.

13. The computer readable medium as recited in claim 11, wherein the computer-executable instructions are configurable such that the end-user controls the reformatting of the decoded data by specifying at least one delimiter.

14. The computer readable medium as recited in claim 11, wherein the computer-executable instructions are configurable such that the end-user controls the reformatting of the decoded data by specifying at least one data element which is to be deleted from the reformatted data collection.

15. The computer readable medium as recited in claim 9, wherein the reformatting step further comprises the step of demarcating at least one demarcated data element to produce demarcated sub-elements.

16. The computer readable medium as recited in claim 15, wherein the reformatting step further comprises the step of altering the relative order of the demarcated sub-elements.

17. The computer readable medium as recited in claim 9, wherein the reformatting step further comprises the step of altering the relative order of the demarcated elements.

18. The computer readable medium as recited in claim 9, wherein the step of selecting the computer-executable program includes the step of determining the identity of the software application.

19. The computer readable medium as recited in claim 9, wherein the software application includes a current cursor position and the step of selecting the computer-executable program is based upon the current cursor position.

20. The computer-readable medium as recited in claim 9, wherein the step of reformatting further comprises the step of annotating the data collection.

21. The computer-readable medium as recited in claim 20, wherein the step of annotating includes adding a data label to the data collection.

22. The computer-readable medium as recited in claim 20, wherein the step of annotating includes adding a delimiter between each of the data elements.

23. The computer-readable medium as recited in claim 22, wherein the delimiter is selected from the group consisting of a comma, a tab, a semicolon, a carriage return, and combinations thereof.

24. The computer-readable medium as recited in claim 9, wherein the decoded data is comprised of at least three data elements.

25. The computer-readable medium as recited in claim 9, wherein the barcode scanner scanned a barcode and generated coded data with a symbology, wherein the computer-executable instruction is selected based on the symbology of the barcode.

26. A computer-readable medium having computer-executable instructions for performing a method comprising the steps of:

receiving decoded data from a barcode scanner, wherein the decoded data is comprised of a plurality of data elements, selecting a computer-executable instruction from a plurality of computer-executable instructions, wherein the plurality of computer-executable instructions each contain reformatting instructions, reformatting the decoded data in accordance with the selected computer-executable instructions by demarcating the decoded data into a plurality of data elements in accordance with the selected computer-executable instructions, thus producing a plurality of demarcated data elements, tokenizing at least one of the demarcated data elements in accordance with the selected computer-executable instructions, thereby producing tokenized data elements, and compiling at least one of the tokenized data elements in accordance with the selected computer-executable instructions to produce a reformatted data collection, wherein the reformatted data includes a delimiter separating the data elements, and the data elements are in an order specified in the selected computer-executable instructions, providing the reformatted data collection to a software application, wherein the software application has data formatting requirements, and the selected computer-executable instructions were selected to satisfy the formatting requirements, and wherein the step of selecting the computer-executable instructions includes the step of determining which barcode scanning terminal provided the decoded data.

27. The computer-readable medium as recited in claim 26, wherein the decoded data is comprised of a source indicator wherein the computer-executable instruction is selected based on the indicator.

* * * * *